United States Patent [19]

Nishimura et al.

[11] Patent Number: 4,686,446

[45] Date of Patent: Aug. 11, 1987

[54] POWER GENERATION CONTROL APPARATUS FOR ALTERNATING CURRENT GENERATOR

[75] Inventors: Shinji Nishimura; Hifumi Wada; Keiichi Komurasaki, all of Himeji, Japan

[73] Assignee: Mitsubishi Denki Kabushiki Kaisha, Tokyo, Japan

[21] Appl. No.: 836,827

[22] Filed: Mar. 6, 1986

[30] Foreign Application Priority Data

Mar. 14, 1985 [JP] Japan ................................ 60-50951
Mar. 14, 1985 [JP] Japan ................................ 60-50952

[51] Int. Cl.$^4$ ............................................. H02J 7/14
[52] U.S. Cl. ...................................... 322/33; 320/35; 320/64; 322/28
[58] Field of Search .................... 322/28, 29, 33, 34, 322/73; 320/36, 35, 64

[56] References Cited

U.S. PATENT DOCUMENTS

| 4,368,417 | 1/1983 | Matsuyama et al. | 322/29 |
| 4,385,270 | 5/1983 | Balan et al. | 322/33 X |
| 4,435,676 | 3/1984 | Morishita | 322/33 |
| 4,470,003 | 9/1984 | Mitchell | 320/64 X |
| 4,496,898 | 1/1985 | Iwaki et al. | 322/34 |
| 4,612,493 | 9/1986 | Katashima et al. | 320/64 |

FOREIGN PATENT DOCUMENTS

59-47532 11/1984 Japan .
59-213239 12/1984 Japan .

Primary Examiner—R. J. Hickey
Attorney, Agent, or Firm—Leydig, Voit & Mayer

[57] ABSTRACT

A control apparatus for a vehicle alternating current generator comprising a switching device operable in response to the detection of an operating state temperature to control the field current of the generator independently of another switching device performing a field current control based on the output voltage of the generator, thereby to limit the output current of the generator.

2 Claims, 5 Drawing Figures

POWER GENERATION CONTROL APPARATUS FOR ALTERNATING CURRENT GENERATOR

BACKGROUND OF THE INVENTION

The present invention relates generally to an apparatus for controlling the power generation of an alternating current generator (hereafter referred to as an A-C generator) for use in a vehicle and, more particularly, to an apparatus for controlling the output current of the A-C generator by controlling the field current thereof independently of the field current control by the detection of the output voltage of the A-C generator.

In a conventional vehicle alternating generator system, it is a known practice to decrease the output voltage of the generator for the purpose of temporarily reducing the driving torque thereof or suppressing an excessive temperature rise during the power generating operation.

With such a conventional control system, however, as the output current of the power generator may vary depending upon the state of a power storage battery and of an electric load owing to the voltage limitation of the output of the power generator, the conventional control system is not fully satisfactory for controlling the output of the generator.

Also, when the operating temperature of the power generator becomes excessively high, the power generator is disconnected from the load so that power supplied to the electric load of the vehicle is only from the vehicle storage battery, thus causing the battery to be unnecessarily discharged, whereby the voltage of the power source of the vehicle is lowered. A low power source voltage may inadvertently have an effect on various electronic devices provided in recent designed vehicles, and to avoid the lower source voltage necessitates the installation of a large capacity storage battery.

On the other hand, Japanese Publication No. 59-47532 disclosed a battery charging apparatus including a battery charged through a rectifier by the output of an A-C generator having a field coil, and a voltage regulator for regulating the output voltage of the generator at a constant value by controlling the field current. Particularly in this apparatus, at least one temperature sensor and a protecting unit are additionally provided. When the sensor senses the temperature of the rectifier and the voltage regulator or parts thereof being heated in excess of a preset value, the protecting unit controls the current flowing through the field coil to reduce or interrupt the output of the generator.

SUMMARY OF THE INVENTION

It is accordingly an object of the present invention to provide a power generation control apparatus for an A-C generator, wherein the output current of the generator can be limited readily and appropriately and independently of the condition of an electrical load on a power storage battery in response to a signal representing an operating state, for example, over-temperature of a portion of the power generation apparatus.

It is another object of the invention to provide a power generation control apparatus for a vehicle A-C generator, which is suited for the protection of the generator from thermal damage due to over-temperature and provides a stable power supply to a power storage battery and an electrical load with a specified output voltage from the A-C generator without power stoppage if the electric load is small and such an over-temperature is not caused due to the self-heating of the generator.

These objects of the invention can be attained by the provision of a power generation control apparatus for an A-C generator according to the invention equipped with a switching means using an oscillator which is specifically adapted to control the field current of the power generator independently of a field current control circuit employing a method of voltage detection of the generator, thus limiting the maximum output current available from the generator.

BRIEF DESCRIPTION OF THE DRAWINGS

The invention will be fully understood from the following description of preferred embodiments thereof when read in conjunction with the accompanying drawings, in which like parts are designated by like reference numerals, and in which.

DETAILED DESCRIPTION OF THE PREFERRED EMBODIMENTS

Before proceeding with the explanation of the preferred embodiments of the invention in detail, it should be noted that the invention is not limited to the detailed structures and the arrangement of components as set forth in the following description or illustrated in the drawings. The invention can be practiced in various ways. Also, it is to be understood that the words and phrases as employed herein are merely for the purpose of description and should not be taken as being restrictive in any way.

The invention will now be explained in connection with a power generation control apparatus by way of preferred embodiments thereof in conjunction with the accompanying drawings.

Figure 1:
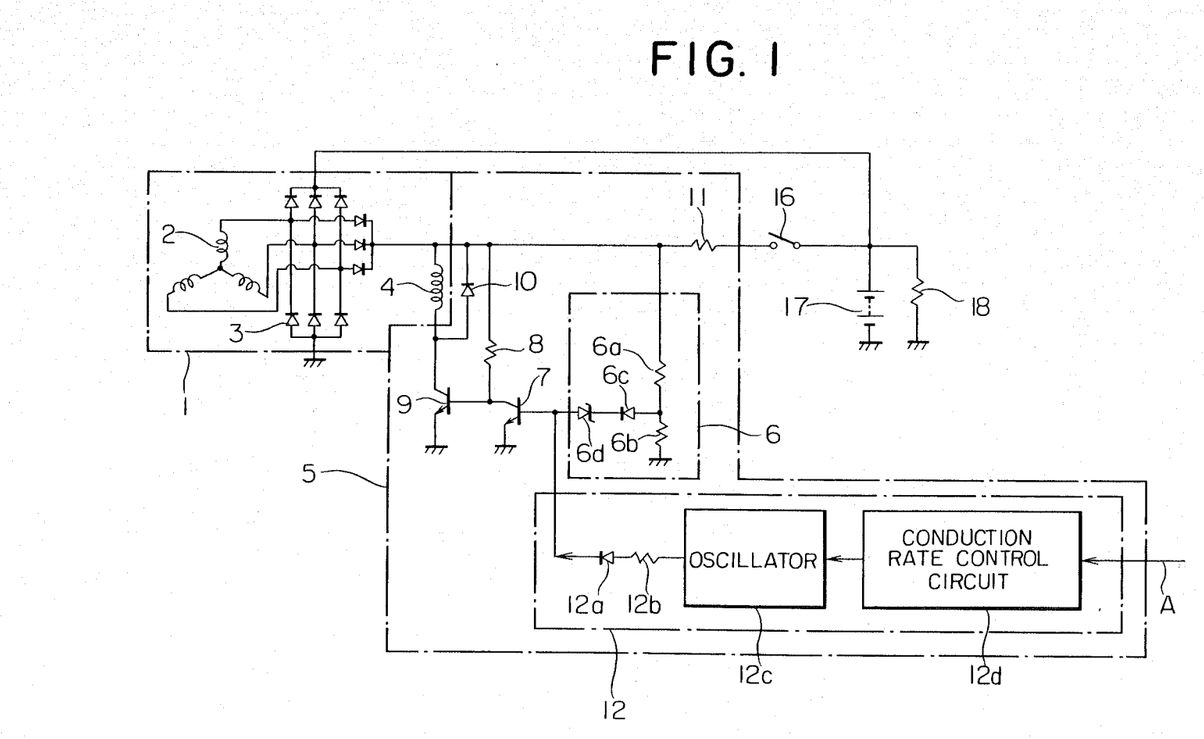
FIG. 1 is a circuit diagram showing a preferred embodiment of a power generation control apparatus for an A-C generator in accordance with the present invention.

Referring firstly to FIG. 1, there is shown a first embodiment thereof. In FIG. 1, shown is an A-C power generator 1 which comprises an armature winding 2, a three-phase full-wave rectifier 3 and a field winding 4, the output terminal of the three-phase full-wave rectifier 3 supplying power to a storage battery 17 and an electrical load 18. An initial exciting current is provided from the storage battery 17 to the field winding 4 through a key switch 16 and an initial exciting resistor 11. A power generation control apparatus 5 according to the present invention comprises a first switching means 6, a second switching means 12, control switching means effective to control the field winding current including a transistor 7 serving as a switching device, and a power transistor 9, a resistor 8, a flywheel diode 10, and an initial exciting resistor 11, the second switching means 12 being adapted to set the conduction rate of its output waveform at a desired level in accordance with an external output limitation demand signal A representing an operating state coupled to the input to the switching means 12. This second switching means 12 is provided independently of the first switching means 6.

The first switching means 6 has a resistor 6a and a resistor 6b connected in series across the output terminal of the three-phase full-wave rectifier 3 and ground, the node between the resistors 6a and 6b being connected to the base of the transistor 7 through a diode 6c and a Zener diode 6d for the detection of the output voltage of the power generator 1. With these components, there is provided the first switching means 6.

It is also seen that the transistor 7 has its emitter electrode grounded, with its collector electrode being connected through a resistor 8 to the output terminal of the three-phase full-wave rectifier 3 and also to the base of the power transistor 9.

The power transistor 9 has its emitter electrode grounded, with its collector electrode being connected through the field winding 4 to the output terminal of the three-phase full-wave rectifier 3. Connected in parallel with this field winding 4 is the flywheel diode 10.

On the other hand, the second switching means 12 has a conduction rate control circuit 12d which is coupled to receive the output limitation demand operating state signal A. This conduction rate control circuit 12d transmits its output to an oscillator 12c. The output from the oscillator 12c is transmitted to the base of the transistor 7 through a resistor 12b and a diode 12 connected in series.

In the operation of the first embodiment of the invention which has the construction as noted above, when the key switch 16 is closed for starting the power generation by the power generator 1 to be driven by an engine (not shown), the power transistor 9 is conductive due to the current from the battery 17 through the key switch 16, the initial exciting resistor 11 and the resistor 8, thereby energizing the field winding 4 so that the power generation is started.

At this time, if the output voltage of the power generator 1 becomes higher than a predetermined value, the Zener diode 6d is turned ON, causing the first switching means 6 which is a voltage detecting circuit to be actuated, and the transistor 7 to turn ON, which in turn causes the power transistor 9 to turn OFF, thus causing the power generation to be stopped. Therefore, the output voltage of the generator 1 is caused to drop, causing the Zener diode 6d to again turn OFF, which will cause the first switching means 6 to stop operating. Thus, again the transistor 7 is turned OFF, and the power transistor 9 is turned ON, thus resuming the power generation, whereby the output of the generator 1 is maintained constant.

Now, assuming that the second switching means 12 is activated by the external signal A for demanding the output limiting operation, in which the transistor 7 is repeatedly switched ON/OFF with the conduction rate of 60%, for instance, by the conduction rate control circuit 12d and the oscillator 12c, the power transistor 9 is also repeatedly switched ON/OFF correspondingly with the conduction rate of 40%, thus causing the average current flowing through the field winding 4 to be 40% of the normal maximum field current.

If the electrical load 18 is sufficiently small, then the output voltage from the power generator 1 will become higher, causing the first switching means 6 serving as a voltage detecting circuit to activated so as to control the field current as noted above, so that the output voltage of the generator 1 is controlled at a predetermined value as if the second switching means 12 were not activated.

In contrast, if the capacity of the electrical load 18 is large, the output voltage of the generator 1 will not become as high, so that the first switching means 6 serving as a voltage detecting circuit is not activated. Therefore, the field current is controlled by the second switching means 12, resulting in a constant current control with the output current being limited accordingly.

While it has been described that the conduction rate of the second switching means 12 is 60%, it is needless to mention that any other conduction rate such as 10%, 20%, 30% can be used which will provide the corresponding effects on the field current and the output current, respectively.

Figure 2:
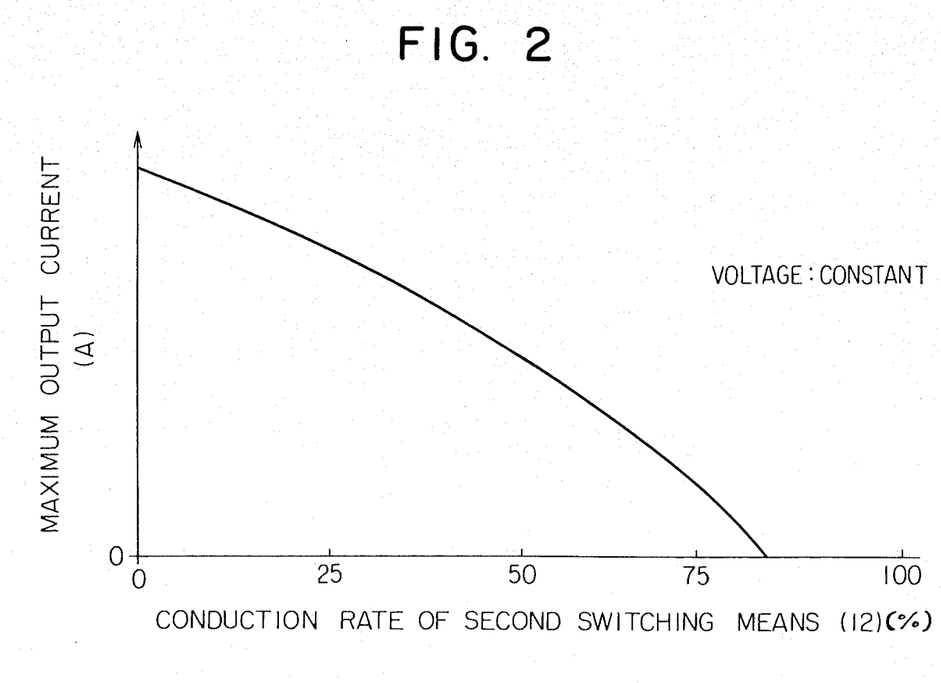
FIG. 2 is a graphic representation showing one example of the relationship between the conduction rate of a second switching means and a maximum output current in the power generation control apparatus shown in FIG. 1.

In FIG. 2, shown is a typical example of the relationship between the conduction rate and the maximum output current of the second switching means 12. It can be appreciated from FIG. 2 that as the conduction rate of the second switching means 12 is changed, the maximum output current varies correspondingly therewith.

This power generation control apparatus according to the first embodiment of the invention can serve to adequately limit the output current and it can be used as a means to temporarily decrease the driving torque of the power generator 1 or to limit the output of the power generator 1 for the purpose of suppressing a temperature rise.

Figure 3:
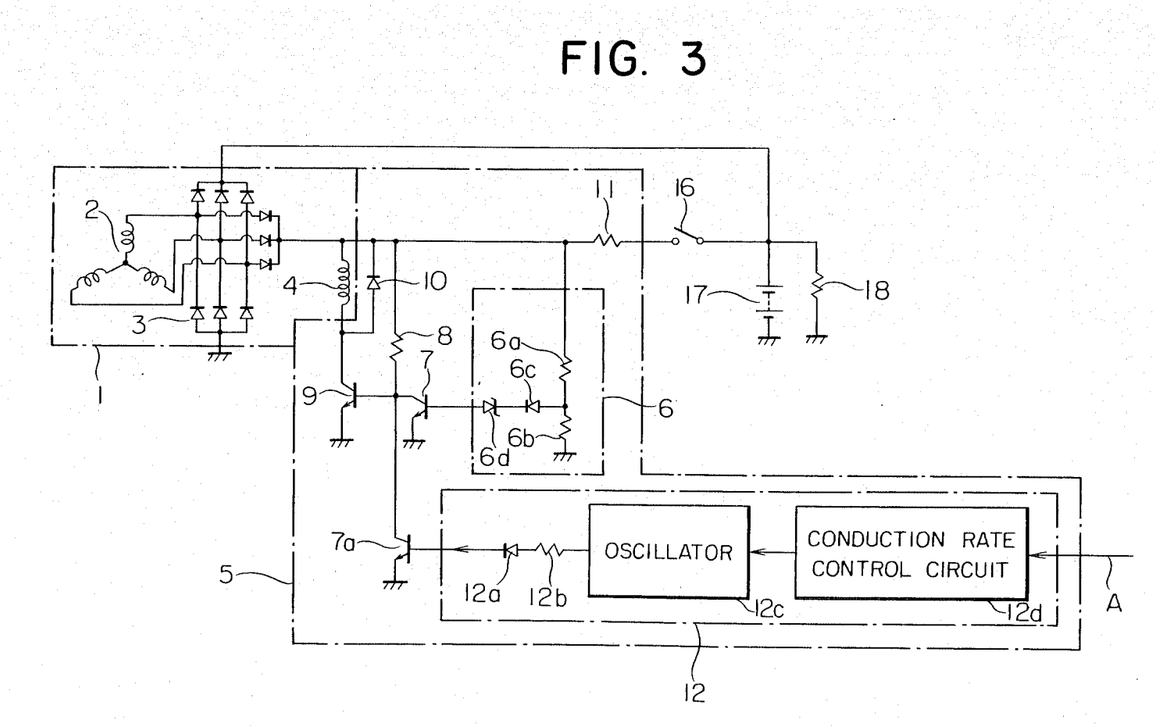
FIG. 3 is a circuit diagram showing another preferred embodiment of a power generation control apparatus for an A-C generator according to the invention.

While the transistor 7 is commonly used for the first switching means 6 serving as a voltage detecting circuit and the second switching means 12 according to the first embodiment of the invention, it is of course feasible in practice to provide another transistor 7a only for the second switching means 12 as shown in FIG. 3, which may provide an equivalent effect.

More specifically, in connection with the construction of a second embodiment of this invention shown in FIG. 3, the cathode of the diode 12a in the second switching means 12 is connected to the base of the transistor 7a, not to the base of the transistor 7, with the emitter electrode of this transistor 7a being grounded and with the collector electrode connected to the base of the power transistor 9, respectively.

With this arrangement, when the oscillator 12c is put into operation, its output is applied through the resistor 12b and the diode 12a to the base of the transistor 7a, with this transistor 7a being turned ON and with the power transistor 9 being turned OFF, thus interrupting the field current to decrease the output voltage of the power generator 1.

While the conduction rate control circuit 12d and the oscillator 12c are constructed individually according to each of the preferred embodiments noted above, they may be substituted by, for instance, a microcomputer which can provide an intermittent output of variable conduction rate as an operation means for providing the output limitation.

Thus, in addition to the function of controlling the output voltage of the power generator by repeatedly intermitting the field current by the detection of the output voltage of the generator by using the first switching means, there is also provided the limiting function for the output voltage of the generator by the actuation of the second switching means independently of the first switching means in accordance with the external signal demanding the output limitation. Consequently, it is possible to limit the output current of the power generator readily and properly independently of the conditions of the storage battery and the electrical load.

Figure 4:
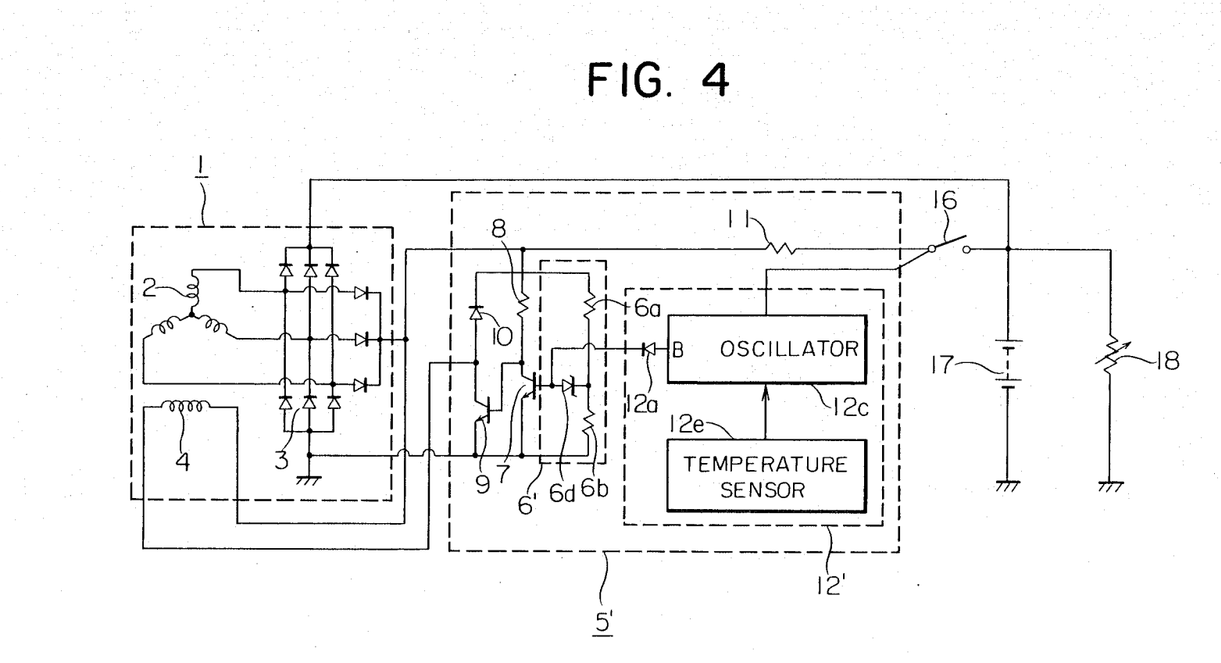
FIGS. 4 and 5 are circuit diagrams showing further preferred embodiments of a power generation control apparatus for an A-C generator according to the present invention.

Referring now to FIG. 4, there is shown a third embodiment of the invention, where a temperature sensor 12e is substituted for the conduction rate control circuit 12d as noted above for controlling the oscillator 12c responsive to an operating state signal directly from the sensor 12e.

This temperature sensor 12e may comprise a known element such as a thermistor, which is mounted at a point where the three-phase full-wave rectifier 3 and a voltage regulator are apt to thermally run away, or at a point around the power generator 1. This sensor 12e is connected in series with resistors (not shown) the divided voltage output of which is fed to the oscillator 12c. The above noted voltage regulator includes the diode 10, the transistors 9 and 6, the resistors 8, 6a, 6b, and the Zener diode 6d.

The oscillator 12c is adapted to start oscillation when an over-temperature is detected by the output from the temperature sensor 12e, whereby the conduction rate is altered and a square wave output from the output terminal B is provided through a current limiting circuit (not shown), which transits from 0 volt (a low level) to the source voltage (a high level). When the key switch 16 is closed, the power is supplied from the storage battery 17 to the oscillator 12e which is then ready for operation. Since all other parts are similar to those shown in FIG. 1, any further description will be omitted.

Next, reference is made to the operation of the embodiment shown in FIG. 4. In the case where the temperature detected by the temperature sensor 12e is normal, the oscillator 12c does not operate at all, that is the conduction rate of 0%, i.e., the output terminal B is held at a low level, thus providing no influence upon the operation of the transistor 7 whereby the output voltage of the power generator 1 is controlled to a predetermined value by the function of the voltage regulator, so that this controlled output voltage is fed to the storage battery 17 and the electrical load 18.

Then, in the case where the temperature detected by the temperature sensor 12e rises higher than the predetermined normal level for some extrinsic factor, the oscillator 12c functions to detect such an abnormal over-temperature operating state in response to the output of the temperature sensor 12e and starts oscillating with a certain conduction rate.

Now, it is assumed in the following description that the oscillator 12c operates under the state where the Zener diode 6d of the voltage regulator is not conductive.

Firstly, when the output terminal B of the oscillator 12c is at the low level, there is no current supplied to the base of the transistor 7, thereby making this transistor non-conductive. For this reason, the power transistor 9 has its base current fed from the base resistor 8, thereby making it conductive so that the field current is fed to the field winding 4 of the power generator 1.

Next, when the output terminal B of the oscillator 12c is at the high level, the transistor 7 has its base fed with a limited base current from the output terminal B of the oscillator 12c through a reverse current blocking diode 12a, causing it to be in the conductive state.

When the transistor 7 is turned ON (i.e., conductive), no base current is supplied to the transistor 9, thus making the transistor 9 non-conductive to interrupt the field current.

In this manner, the transistors 7 and 9 are caused to make their respective switching operations according to the oscillating output of the oscillator 12c, thereby making the intermittent operation of the field winding 4. With this intermittent operation, the average current flowing through the field winding 4 is reduced, accordingly.

On the other hand, as the magnitude of the output current of the A-C power generator 1 is determined by the field magnetomotive force of the field winding 4, the maximum output current of the power generator 1 is limited by the limiting control for the field current. As reviewed hereinbefore, this maximum output current may be selected optionally by way of the conduction rate of the oscillator 12c.

The limitation for the maximum output current of the A-C power generator 1 makes it possible in practice to suppress the self heat generation of the generator 1, the three-phase full-wave rectifier 3 and the voltage regulator due to the limitation of the field current.

Next, reference is made to the case where the generator 1 has an electrical load with current lower than the limited maximum output current limited by the oscillator 12, when the above mentioned temperature is excessively high.

In this case, since the electrical load 18 has the maximum output current or less of the power generator 1 which is limited by the oscillator 12c, there is still a sufficient margin in the output capacity of the A-C generator 1 provided by the field current which is made available during the low level output state of the oscillator 12c, thus making the output voltage of the generator 1 higher.

When this output voltage of the generator 1 becomes higher than the predetermined voltage level of the voltage regulator, the Zener diode 6d will become conductive, causing the transistor 7 to be conductive through the Zener diode 6d when the output of the oscillator 12c is at the low level, thus interrupting the field current. With the repetition of these operations, the output voltage of the A-C gnerator 1 can efficiently be regulated to be the specified level.

In this manner, when the electrical load 18 requires the maximum specified output current or less from the A-C generator 1 to flow therethrough and when the self heat generation at the portions of the A-C generator 1 is relatively low, the voltage regulator may serve to regulate the output voltage of the A-C generator 1 to the specified level as if there were no output fed from the oscillator 12c, thus providing a stable power to the storage battery 17 and the elctrical load 18 from the A-C generator 1 as in the normal operating condition.

Now, reference is made to a condition such that the generator 1 has an electrical load with current higher than the maximum output current limited by the oscillator 12c, during the over-temperature state.

In this state, the electrical load 18 is in excess of the limited maximum output current of the A-C generator 1, which means a shortage in the power generating capacity, and so the output voltage from the A-C generator 1 can not rise. As a consequence, the Zener diode 6d in the voltage regulator is held in its non-conductive state, and then the intermittent current through the field winding 4 will depend only upon the output of the oscillator 12c, thus making the A-C generator 1 serve as a constant power source based on the output of the oscillator 12c to suppress the self-heat generation at these self heating portions.

As the power supply to the electrical load 18 under such a condition depends essentially upon the limited output of the A-C generator 1 and upon the storage battery 17, the discharge from the storage battery 17 will be minimized, thus obviating an unnecessary reduction of the source voltage in the power system of the vehicle.

In this manner, when the electrical load 18 is large and a considerable temperature rise at the self-heating portions of the A-C generator 1 is observed, this A-C generator 1 can serve as a constant power source with its maximum output current limited, as stated above, contributing to the suppression of the heat generation at the self-heating portions of the A-C generator 1 and to the reduction of the temperature of the entire system, thus protecting the heat generating portions of the A-C generator 1 from thermally running away effect, and thus minimizing the discharge of the storage battery 17, which will eventually contribute to the obviation of an unnecessary source voltage drop in the power system of the vehicle.

Also, when such an abnormal over-temperature is detected under a condition that the electrical load 18 is substantially small and that the self heat generation of the A-C generator 1 is relatively low, as reviewed hereinbefore, the A-C generator 1 continues to provide the specified output voltage. Therefore, even in such an abnormal temperature state, the storage battery 17 may continuously be charged as in the normal condition, thus ensuring a stable power supply from the power source of the vehicle as well.

Then, referring to a condition such that an over-temperature due to an extrinsic factor decreases below a specified level, the oscillator 12c will stop its oscillating operation, whereby the voltage regulator will return to its normal operation.

While it has described that the output of the oscillator 12c is of a square wave, any means may be applicable if such means produce an appropriate waveform which serves to control a transistor.

Figure 5:
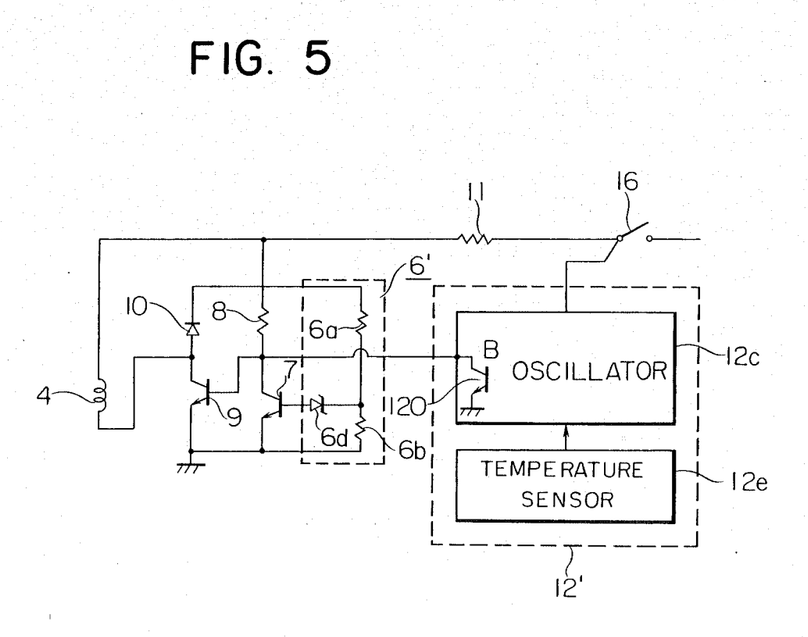

Furthermore, while the transistor 7 is driven by the output from the oscillator 12c in the preferred embodiments noted hereinbefore, it is of course practical that the power transistor 9 be driven immediately by the oscillator 12c as typically shown in a fourth embodiment of this invention of FIG. 5. In this embodiment shown in FIG. 5, there is shown provided a driver transistor designated by the reference numeral 120, which is incorporated in the oscillator 12c.

With this construction, as reviewed hereinbefore, when there is a substantially large electrical load, the power generation control apparatus of this invention may serve as a constant current source with the self heat generation suppressed efficiently, while when the electrical load is relatively small, there may be be available a predetermined (specified) regulated voltage, so that the working portions of the A-C generator are protected from thermal damages, and also an excessive discharge of the storage battery is minimized, thus eventually attaining an advantageous effect of providing a stable power supply for the vehicle.

While the present invention has been described in detail by way of specific preferred embodiments thereof, it is to be understood that the present invention is not intended to be restricted to the details of the specific constructions shown in the preferred embodiments, but to contrary, the present invention can of course be practiced in many other arrangement to an equal advantageous effect in accordance with the foregoing teachings without any restriction thereto and without departing from the spirit and scope of the invention.

It is also to be understood that the appended claims are intended to cover all of such generic and specific features particular to the invention as disclosed herein and all statements relating to the scope of the invention, which as a matter of language might be said to fall thereunder.

What is claimed is:

1. A control apparatus for a vehicle alternating current generator means supplying an output voltage to a battery and an electric load connected across said generator means output voltage and said battery, said generator means having a field winding, said control apparatus comprising, in combination:

voltage regulating means for controlling the output voltage of said generator means to a predetermined regulated value including a first switching means connected to detect the output voltage and operating to switch on and off at the predetermined regulated value;

control means for controlling field current in said field winding in response to the operating of said first switching means to maintain the output voltage at the regulated value;

second switching means connected to operate said control means independently of said first switching means so as to control the output voltage of said generator means independently of said first switching means upon the occurrence of an operating state;

said second switching means including a temperature sensor for detecting the operating state temperature of at least one of the portions of said generator means which are subject to a self-heat generation; and an oscillator for generating an output signal oscillating at a conduction rate corresponding to the temperature detected by said temperature sensor.

2. A control apparatus for a vehicle alternating current generator means supplying an output voltage to a battery and an electric load connected across said generator means output voltage and said battery, said generator means having a field winding, said control apparatus comprising, in combination:

voltage regulating means for controlling the output voltage of said generator means to a predetermined regulated value including a first switching means connected to detect the output voltage and operating to switch on and off at the predetermined regulated value;

control means for controlling field current in said field winding in response to the operating of said first switching means to maintain the output voltage at the regulated value;

second switching means connected to operate said control means independently of said first switching means so as to control the output voltage of said generator means independently of said first switching means upon the occurrence of an operating state;

said second switching means including a temperature sensor for detecting the operating state temperature of the atmosphere around said generator means which is subject to a self-heat generation; and
an oscillator for generating an output signal oscillating at a conduction rate corresponding to the temperature detected by said temperature sensor and coupled to operate said control means.

* * * * *